(12) United States Patent
Chen et al.

(10) Patent No.: US 7,006,191 B2
(45) Date of Patent: Feb. 28, 2006

(54) MANUFACTURING METHOD FOR MICRODISPLAY

(75) Inventors: Sheng-Lung Chen, Hsinchu (TW); Da-Shuang Kuan, Hsinchu Hsien (TW)

(73) Assignee: United Microelectronics Corp., Hsinchu (TW)

( * ) Notice: Subject to any disclaimer, the term of this patent is extended or adjusted under 35 U.S.C. 154(b) by 256 days.

(21) Appl. No.: 10/410,807

(22) Filed: Apr. 9, 2003

(65) Prior Publication Data

US 2004/0189929 A1 Sep. 30, 2004

(30) Foreign Application Priority Data

Mar. 24, 2003 (TW) .......................... 92106446 A

(51) Int. Cl.
 *G02F 1/1333* (2006.01)
 *G02F 1/13* (2006.01)
 *G02F 1/1339* (2006.01)

(52) U.S. Cl. ................ 349/158; 349/160; 349/187; 349/153

(58) Field of Classification Search ............... 349/158, 349/160, 187, 155, 5, 73, 153, 190

See application file for complete search history.

(56) References Cited

U.S. PATENT DOCUMENTS

| | | | | | |
|---|---|---|---|---|---|
| 5,963,281 | A | * | 10/1999 | Koons et al. .................. 349/73 |
| 6,018,380 | A | * | 1/2000 | Hu et al. ...................... 349/153 |
| 6,476,886 | B1 | * | 11/2002 | Krusius et al. ................ 349/73 |
| 6,521,475 | B1 | * | 2/2003 | Chen et al. ................... 438/34 |
| 6,582,988 | B1 | * | 6/2003 | Hsiao et al. .................. 438/70 |
| 6,686,977 | B1 | * | 2/2004 | Smith et al. .................. 349/43 |
| 6,800,210 | B1 | * | 10/2004 | Patel et al. ..................... 216/2 |

\* cited by examiner

*Primary Examiner*—Tarifur R. Chowdhury
*Assistant Examiner*—Mike Qi
(74) *Attorney, Agent, or Firm*—J.C. Patents

(57) ABSTRACT

The present invention provides a manufacturing method for a microdisplay. After providing a wafer with a plurality of pixel structures on the front side, trenches with a pattern are formed on the backside of the wafer. A transparent plate is disposed above the front side of the wafer and a sealant is applied to join the wafer and the transparent plate. After cutting the wafer and the transparent plate into display cells of suitable sizes, liquid crystal is then introduced in-between the sealant of the display cells.

12 Claims, 4 Drawing Sheets

MANUFACTURING METHOD FOR MICRODISPLAY

CROSS-REFERENCE TO RELATED APPLICATION

This application claims the priority benefit of Taiwan application serial no. 92106446, filed Mar. 24, 2003.

BACKGROUND OF THE INVENTION

1. Field of Invention

The present invention relates to a manufacturing method of a microdisplay. More particularly, the present invention relates to a manufacturing method for improving the non-uniformity of the microdisplay.

2. Description of Related Art

Liquid crystal pixel structure has been widely applied in daily life applications, including liquid crystal televisions, liquid crystal monitors of portable computers or desktop personal computers and liquid crystal projectors. For large-scale displays, the liquid crystal projectors are particularly important. The core element of the liquid crystal projector is the optical engine that generally includes a light source, an optical component consisting of prism pairs and several liquid crystal panels (LCPs) corresponding to different optical paths (R, G, B). The liquid crystal panels, being one type of microdisplays, have pixels of small sizes. Because of the small-sized pixels in the liquid crystal panels, liquid crystal on silicon (LCOS) technology is commonly employed to fabricate the liquid crystal panels.

The LCOS liquid crystal panel is in fact a silicon wafer back panel, by using MOS transistors in place of the thin film transistors used in the conventional liquid crystal displays (LCDs). Since the pixel electrodes of the LCOS liquid crystal panel are made of metal materials, the LCOS liquid crystal panel is a reflective type liquid crystal panel. Moreover, because the metal pixel electrodes completely cover the pixel region, especially the MOS transistors, the LCOS liquid crystal panel is superior in image display compared with conventional LCDs. Hence, the LCOS liquid crystal panels are dominantly used in the liquid crystal projectors.

FIG. 1 is a display view of the structure for the prior art microdisplay under assembly. As shown in FIG. 1, the conventional microdisplay usually includes a silicon wafer substrate 100 with a pixel structure 104 on the front side and a glass plate 102 disposed opposite to the front side of the silicon wafer 100.

FIG. 2 is a cross-sectional view of the prior art microdisplay structure in FIG. 1 after assembly. As shown in FIG. 2, a sealant 106 is usually used to glue the silicon wafer substrate 100 together with the glass plate 102. After cutting the glued glass plate 102 and the silicon wafer substrate 100 into display cells of suitable sizes, liquid crystal is then filled into the space (gap) between the silicon wafer substrate 100 and the glass plate 102.

However, because of the high temperature in the thermal processes and the formation of layers in different materials on the silicon wafer substrate 100, the stress acting on the silicon wafer substrate 100 often leads to distortion or warp in the silicon wafer substrate 100. Once the silicon wafer substrate 100 is distorted, bent or even arched, the central gap 110 of the display cell will be larger than the edge gap 112. Such non-uniformity, resulting from uneven gaps between the silicon wafer substrate 100 and the glass plate 102 in different locations, gives rise to inconsistency in projected images.

Although spacers are implemented in the conventional LCDs to lessen variation of gaps, application of spacers in microdisplays, especially microdisplays of liquid crystal projectors, had better be avoided so as to increase the quality of images.

SUMMARY OF THE INVENTION

The present invention provides a manufacturing method of a microdisplay for preventing the non-uniformity of gaps between the silicon wafer and the glass.

The present invention provides a manufacturing method of a microdisplay for improving the inconsistency of the projection (projected images).

The present invention provides a manufacturing method of a microdisplay, which greatly improves planarity of the wafer.

As embodied and broadly described herein, the present invention provides a manufacturing method for a microdisplay, which can reduce stress of the wafer substrate and help keep planarity of the wafer substrate. Before the assembly of the wafer substrate and the plate, the backside of the wafer substrate is cut to form a trench pattern, so that the stress of the wafer substrate is reduced. Consequently, even and uniform gaps are formed between the wafer substrate and the transparent plate in different locations after fitting the wafer substrate and the plate together. Such uniformity of gaps between the wafer substrate and the glass plate results in high-quality and undeviating images.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

First Embodiment

Figure 1:
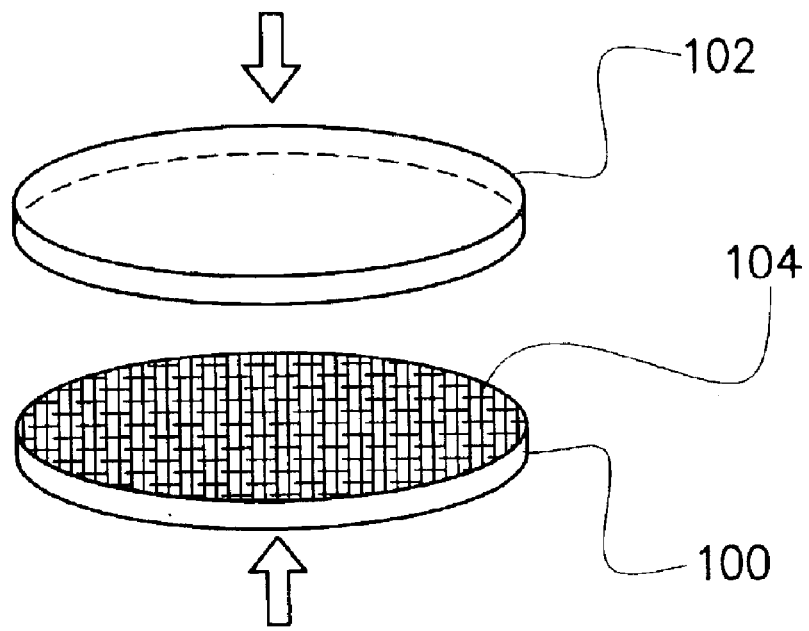
FIG. 1 is a display view of the prior art microdisplay structure under assembly.
Figure 2:
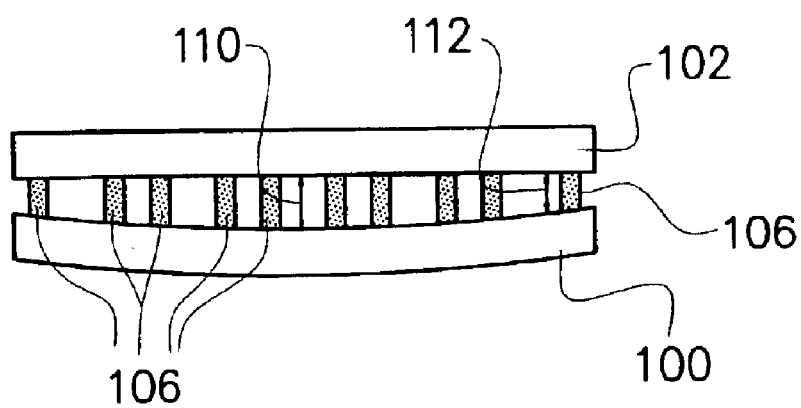
FIG. 2 is a cross-sectional view of the prior art microdisplay structure in FIG. 1 after assembly.
Figure 3A:
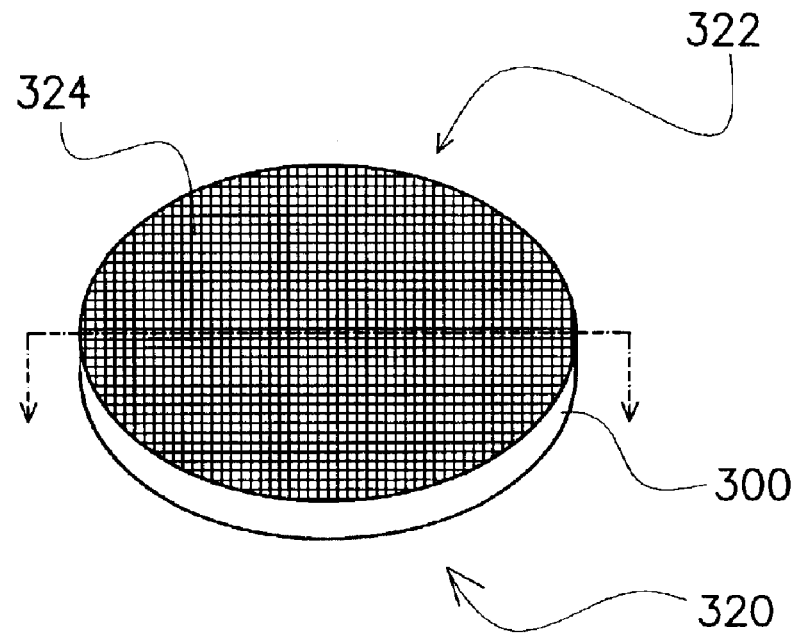
FIG. 3A is a three-dimensional view of the wafer substrate for a microdisplay after cutting according to one preferred embodiment of the present invention.
Figure 3B:
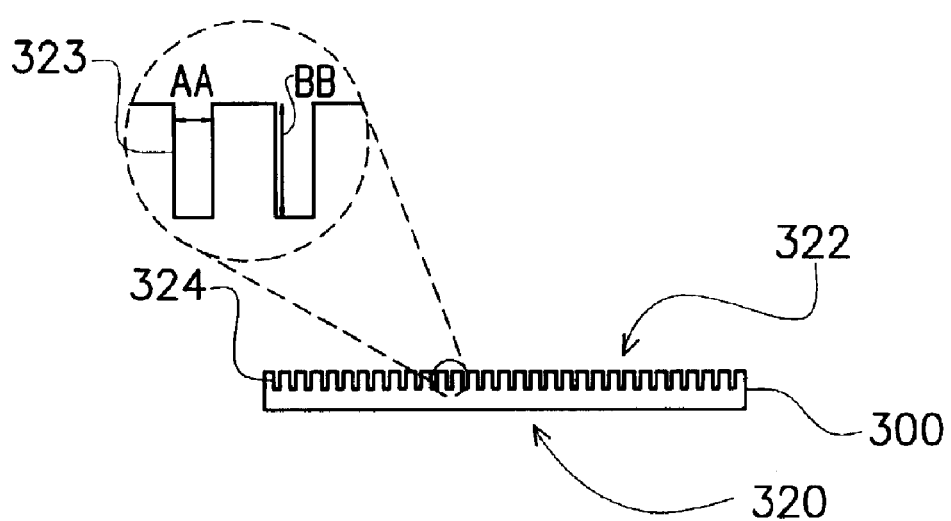
FIG. 3B is a cross-sectional view of the wafer substrate for a microdisplay after cutting according to one preferred embodiment of the present invention.

FIG. 3A is a three-dimensional view of a wafer substrate for a microdisplay after cutting according to the first preferred embodiment of the present invention, while FIG. 3B is a cross-sectional view of the wafer substrate of FIG. 3A. Referring to FIGS. 3A and 3B, a wafer substrate 300 is provided, while a plurality of pixel structures 304 (shown in FIG. 4) are formed on the front side 320 of the wafer substrate 300. For example, the wafer substrate 300 is a silicon wafer substrate. The backside 322 of the wafer substrate 300 is cut or sectioned in order to form trenches 323 with a pattern 324. The trenches are formed in a grid pattern or a checker pattern, or in other arranged patterns. As shown in an enlarged view (left side) for a portion of the wafer substrate in FIG. 3B, the trenches 323 of the grid pattern 324 have a width AA of about 50–150 microns and a depth BB of about 50–300 microns. For example, laser cutting is used to perform the cutting of the wafer substrate (to form trenches in a pattern).

Figure 4:
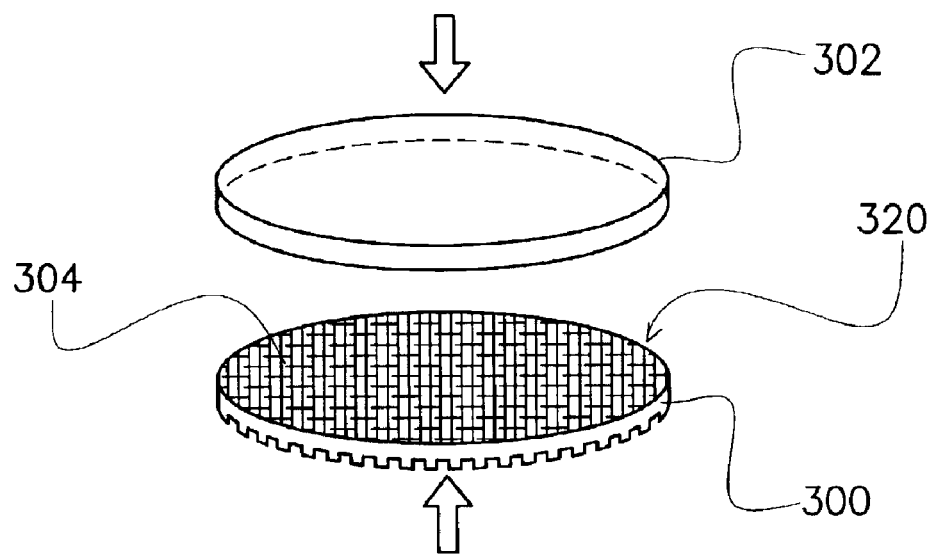
FIG. 4 is a display view for the wafer substrate and the transparent plate of the microdisplay under assembly according to one preferred embodiment of the present invention.

FIG. 4 is a display view for the wafer substrate and the transparent plate of the microdisplay under assembly according to the first preferred embodiment of the present invention. A transparent plate 302 is disposed above the front side 320 of the wafer substrate 300. The transparent plate 302 is, for example, a glass plate.

Figure 5:
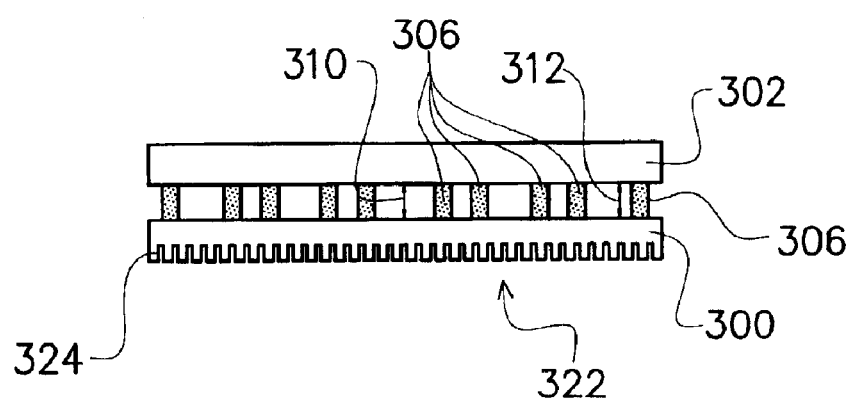
FIG. 5 is a cross-sectional view for the wafer substrate and the transparent plate of the microdisplay after assembly according to one preferred embodiment of the present invention.

FIG. 5 is a cross-sectional view for the wafer substrate and the transparent plate of the microdisplay after assembly according to the first preferred embodiment of the present invention. A sealant 306 is applied between the front side 320 of the wafer substrate 300 and the transparent plate 302, so that the wafer substrate 300 is adhered to the transparent plate 302. Liquid crystal 314 is introduced (injected) in-between the wafer substrate 300, the transparent plate 302 and the sealant 306.

Figure 6:
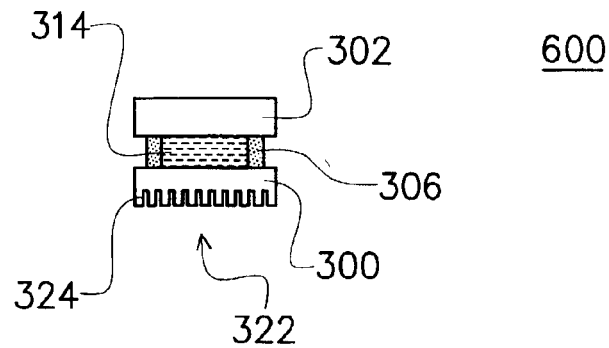
FIG. 6 is a cross-sectional display view of a microdisplay after cutting according to one preferred embodiment of the present invention.

FIG. 6 is a cross-sectional display view of a microdisplay after cutting according to the first preferred embodiment of the present invention. As shown in FIG. 6, the wafer substrate 300 and the transparent plate 302 are cut into display cells 600 of a suitable size and a liquid crystal layer 314 is then applied into the display cell 600.

Since the backside 322 of the wafer substrate 300 is sectioned to form trenches 323 with a pattern 324, the stress resulting from the oxide film (not shown) on the backside 322 of the wafer substrate 300 can be reduced. Hence, no distortion or warp occurs to the wafer substrate 300, even after the wafer substrate 300 is adhered to the transparent plate 302. The present invention provides even and uniform gaps in different locations. Taking the central gap 310 and the edge gap 312 as an example, no great difference is found among these two gaps.

Second Embodiment

Figure 7:
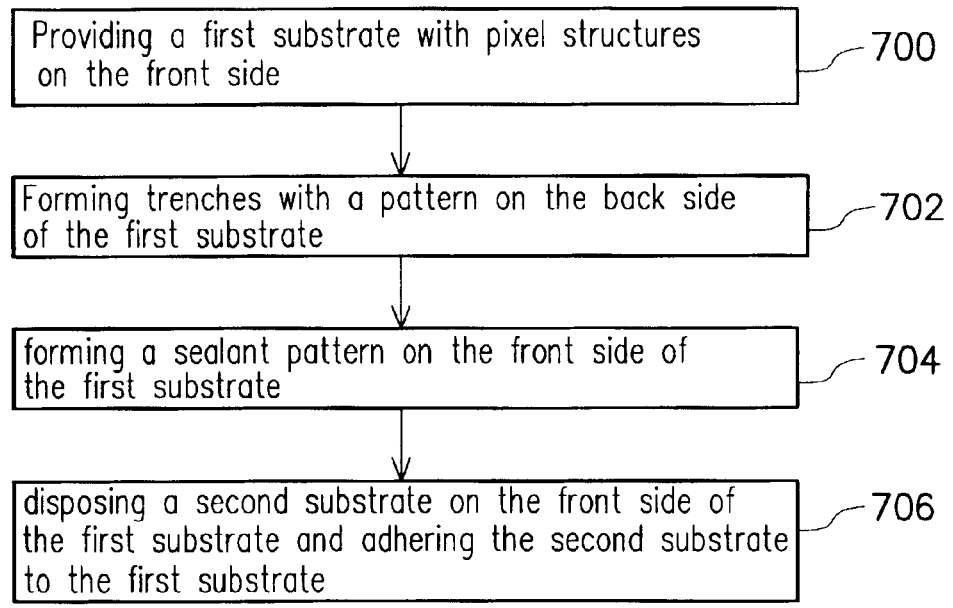
FIG. 7 is a flow chart showing the process steps for improving uniformity of the microdisplay according to another preferred embodiment of the present invention.

FIG. 7 is a flow chart showing the process steps for improving uniformity of the microdisplay according to the second preferred embodiment of the present invention. In step 700, a first substrate is provided with a plurality of pixel structures formed on the front side of the first substrate. In step 702, the backside of the first substrate is sectioned (cut) to form trenches with a pattern. The trenches are formed in a grid pattern or a checker pattern, or in other arranged patterns by, for example, laser cutting, while the trenches have a width of about 50–150 microns and a depth of about 50–300 microns.

In step 704, a sealant pattern is formed on the front side of the first substrate. In step 706, a second substrate is arranged above the front side of the first substrate, so that the first substrate is adhered to the second substrate.

In conclusion, the present invention has the following advantages:

Since the backside of the wafer substrate is sectioned to form trenches with a pattern, the stress can be reduced.

Because the wafer substrate is cut with the pattern, the wafer can keep planarity even after the wafer substrate is adhered to the transparent plate, thus providing even and uniform gaps in different locations between the wafer substrate and the transparent plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method for a microdisplay, comprising:

providing a wafer, wherein a front side of the wafer has a plurality of pixel structures;

forming trenches with a pattern on a backside of the wafer;

disposing a transparent plate above the front side of the wafer;

providing a sealant between the front side of the wafer and the transparent plate, so that the wafer is adhered to the transparent plate;

cutting the wafer and the transparent plate to form a plurality of display cells; and introducing liquid crystal in-between the sealant of the display cells.

2. The method of claim 1, wherein the method of forming trenches with a pattern includes performing laser cutting.

3. The method of claim 1, wherein the pattern is a checker pattern.

4. The method of claim 1, wherein the trenches have a width of about 50–150 microns.

5. The method of claim 1, wherein the trenches have a depth of about 50–300 microns.

6. The method of claim 1, wherein the wafer comprises a silicon wafer.

7. The method of claim 1, wherein the transparent plate comprises a glass plate.

8. A method for improving uniformity of a microdisplay, comprising:

providing a first substrate, wherein a front side of the first substrate has a plurality of pixel structures;

forming trenches with a pattern on a backside of the first substrate;

forming a sealant pattern on the front side of the first substrate; and disposing a second substrate above the front side of the first substrate, so that the first substrate is adhered to the second substrate.

9. The method of claim 8, wherein the method of forming trenches with a pattern includes performing laser cutting.

10. The method of claim 8, wherein the pattern is a checker pattern.

11. The method of claim 8, wherein the trenches have a width of about 50–150 microns.

12. The method of claim 8, wherein the trenches have a depth of about 50–300 microns.

* * * * *